United States Patent [19]

Wanasz

[11] Patent Number: 4,745,340
[45] Date of Patent: * May 17, 1988

[54] ELECTRIC GENERATOR SYSTEM FOR PORTABLE FLOODLIGHTING EQUIPMENT

[75] Inventor: Michael J. Wanasz, Littleton, Colo.

[73] Assignee: Herbert F. Koether, Denver, Colo.

[*] Notice: The portion of the term of this patent subsequent to May 27, 2003 has been disclaimed.

[21] Appl. No.: 868,115

[22] Filed: May 27, 1986

Related U.S. Application Data

[63] Continuation-in-part of Ser. No. 513,295, Jul. 14, 1983, Pat. No. 4,591,763.

[51] Int. Cl.⁴ ............................................. H05B 41/16
[52] U.S. Cl. ...................... 315/144; 307/16; 315/140; 315/224; 315/281; 315/288; 322/90
[58] Field of Search .............. 322/90, 93; 307/16; 310/198; 315/224, 254, 255, 281, 288, 140, 144

[56] References Cited

U.S. PATENT DOCUMENTS

| | | | |
|---|---|---|---|
| 652,701 | 6/1900 | Wurts | 315/288 |
| 2,098,002 | 11/1937 | Guerin et al. | 315/281 |
| 3,160,772 | 12/1964 | Miron | 322/90 |
| 3,178,610 | 4/1965 | Moerkens et al. | 315/288 |
| 3,784,894 | 1/1974 | Silvertown | 322/93 |
| 3,809,995 | 5/1974 | Hardin | 322/90 |
| 4,153,869 | 5/1979 | Ragaly | 322/93 |
| 4,233,555 | 11/1980 | Roche | 307/16 |
| 4,539,486 | 9/1985 | Saito | 322/90 |
| 4,613,796 | 9/1986 | Bay | 315/219 |

Primary Examiner—H. Dixon
Attorney, Agent, or Firm—Wm. Griffith Edwards

[57] ABSTRACT

A power supply system for portable floodlighting equipment employing high-intensity electric discharge lamps comprises an alternating current generator having three or more independent armature windings, one for producing independently current at a voltage sufficiently high for starting a discharge lamp in series with a capacitor. The windings are out of phase with one another and interference with the operation of the lamps energized by the separate and independent windings and electric apparatus energized by the standard voltage generator is effectively eliminated. The use of the generator winding for starting and energizing the lamps eliminates the usual starting ballast and decreases the weight and cost of the portable floodlighting unit.

2 Claims, 2 Drawing Sheets

ELECTRIC GENERATOR SYSTEM FOR PORTABLE FLOODLIGHTING EQUIPMENT

This is a continuation-in-part of co-pending application Ser. No. 06/513,295 filed July 14, 1983, now U.S. Pat. No. 4,591,763 issued May 27, 1986.

This invention relates to alternating current power supplies for floodlighting equipment and the like which employ high-intensity gaseous electric discharge lamps.

Portable floodlighting is employed generally for illuminating construction sites and the outdoor areas of other work and activity. The electric discharge lamp such as the high-intensity metal halide lamp requires a starting voltage substantially higher than the standard 120- and 240- volt domestic power supplies. It is the usual practice to provide transformers or ballasts for this purpose and also capacitors for limiting the lamp current after starting. The ballasts add substantial weight to the equipment, which is particularly undesirable for portable equipment. Portable floodlighting units commonly comprise a trailer carrying an extendable mast on which a plurality of high-intensity electric discharge lamps are mounted and may be raised to elevated positions and an alternating current generator driven by a gasoline or diesel engine. The generator is arranged to provide power for the floodlighting lamps and also for raising the mast and for power tools and other auxiliary electric equipment.

It is an object of the present invention to provide an improved power generation system for portable floodlighting units.

It is another object of this invention to provide an improved alternating current generator system for supplying power both for the higher voltage starting of gaseous discharge lamps and for auxiliary equipment at standard voltages.

It is another object of this invention to provide an improved electric power system for floodlighting equipment and the like, including a single generator for supplying power at a plurality of different voltages.

It is a further object of this invention to provide an improved lighter weight power-generating system for portable floodlighting equipment and the like It is a further object of this invention to provide an improved alternating current power supply for portable floodlighting units and the like, which requires less space, is lower in cost, and requires fewer components.

SUMMARY OF THE INVENTION

Briefly, the power supply system of this invention comprises an improvement on the alternating current generator of the above parent application. The generator is provided with a plurality of independent sets of windings, each connected to supply a respective outlet. Current is supplied by one set of generator windings at a standard voltage, say 120 volts, and by two or more independent sets at a voltage sufficiently high for the starting of the electric discharge lamps, say 530 volts. When a plurality of lamps are employed, each lamp is connected across a respective independent 530-volt output. Capacitors, one in series with each respective lamp, act to limit the current flowing through each lamp after starting. The current of each set of windings is out of phase with that of the others.

Figure 1:
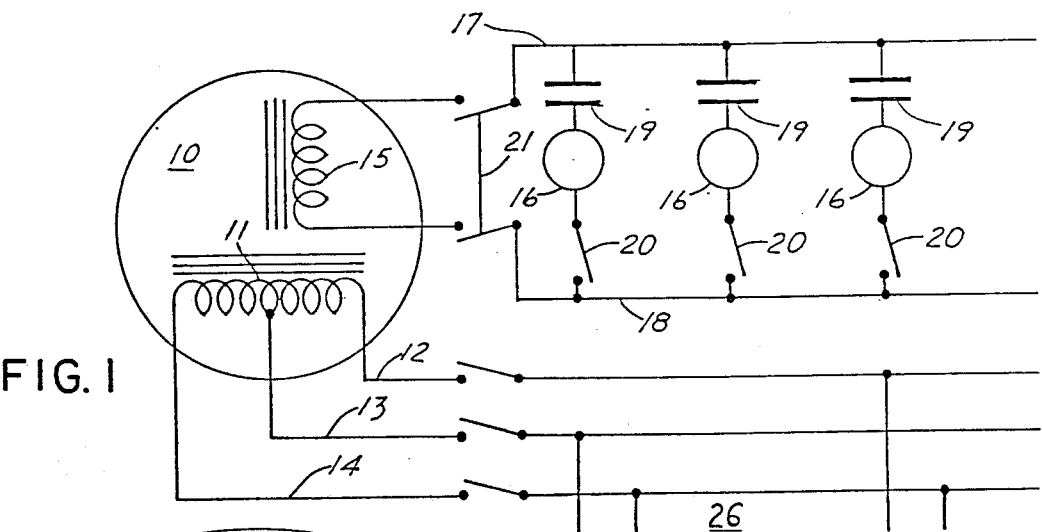
FIG. 1 is a simplified circuit diagram of the power-generating system embodying the invention of the parent application.
Figure 2:
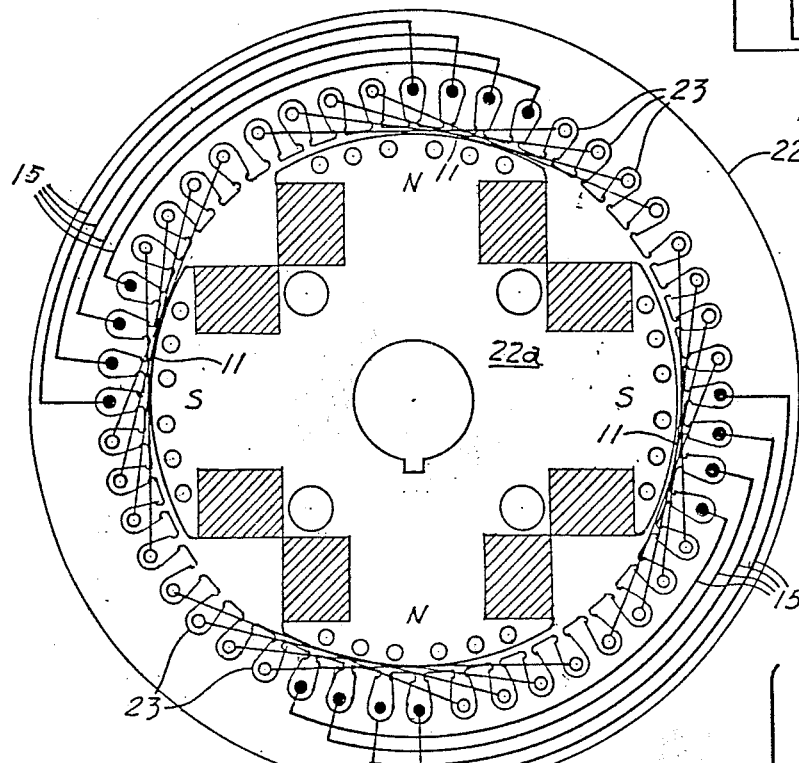
FIG. 2 is a diagrammatic sectional end elevation view of the rotor and stator of a generator for use in the system of FIG. 1.
Figure 3:
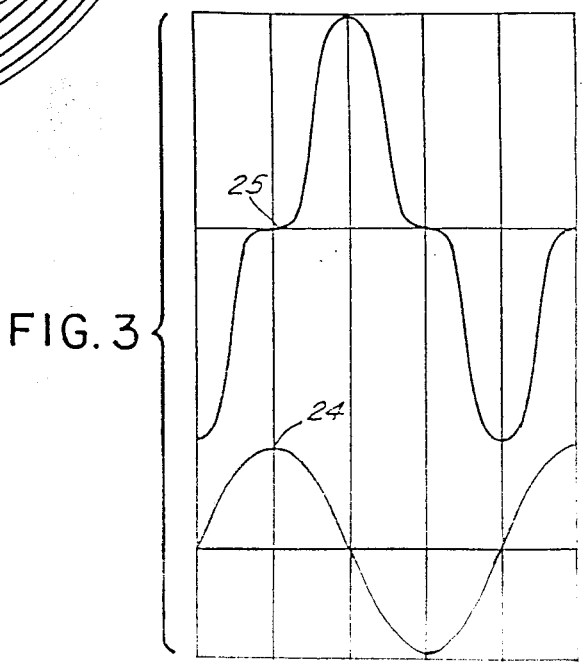
FIG. 3 is a diagram illustrating the wave form and phase relationship of the current flowing in the two circuits of FIG. 1.

DETAILED DESCRIPTION OF FIGS. 1, 2, and 3

The electric generator system of this invention provides a main generator winding for supplying power to the motors for performing various functions in and around a portable floodlighting unit and a lamp current-supply winding for starting and energizing the high-intensity electric discharge lamps of the unit. This system as shown in FIG. 1 includes an alternating current generator 10 having a stator provided with one winding 11 for supplying power at standard voltage, say 120 or 240 volts, through main lines 12, 13 and 14 and a second and separated winding 15 of the coils of which have a sufficient number of turns for supplying power at a higher voltage, say 530 volts, for starting and energizing high-intensity discharge lamps 16 through lines 17 and 18. Each of the lamps is connected in series with a capacitor 19 between lines 17 and 18. Individual switches 20 are provided for selectively energizing the lamps, and a manual switch 21 is provided to connect the generator output to the lamp supply lines 17 and 18.

It has been found that by providing an alternator with two independent sets of windings, standard voltage and higher voltage supplies can be provided and operated to supply separate load systems without objectionable interference with the operation of either system. The armature of a generator suitable for this purpose is illustrated in FIG. 2 in which the armature core, indicated at 22, is provided with forty-eight slots 23 in which the formed multiple-coil winding 11 and 15 are located and are indicated by light lines and heavy lines, respectively, which indicate the relative positions of the windings which are themselves located in the respective ones of the slots 23. Each formed winding is located with its sides in the two slots at the ends of the respective light and heavy line. These light and heavy lines represent the end or return connections between the coils of the windings which have their current-generating sides in the slots. The windings 11 are located in eight pairs of slots 23 in which the sides of the windings are located; and, similarly, the windings 15 are located in four pairs of slots, each slot containing a respective side of a winding. There are two sets of each of the windings 11 and 15 which are indicated in the upper and lower halves, respectively, of the armature as shown in FIG. 2. The armature is used with a rotating field provided by a four-pole rotor 22a having the usual alternate North and South poles. The currents generated in windings on opposite sides of the stator are in phase; and these opposite windings may be connected to the output either in series or in parallel, the series connection being preferred as it provides the higher voltage which is the sum of the voltages of the opposite windings. Thus the standard voltage outputs of the lines 12, 13, and 14 are indicated as connected to two windings in series with a center tap. The terminal connections of the coil ends (not shown) on the opposite side of the stator are made in accordance with the usual series or parallel connections of the windings; the return ends of the individual coils of the windings are, of course, positioned in the usual manner similar to the connections on the near side as shown.

During operation of the generator, the currents flowing in the two windings 11 and 15 are out of phase. This phase relationship is indicated in FIG. 3 in which the curves of the two windings 11 and 15 are shown in time relationship. When the current in the winding 11 is at a maximum positive peak as indicated by the peak 24, the current in the winding 15 is a zero as indicated at 25. The two windings are thus ninety degrees out of phase, or in quadrature. With the windings out of phase, the effect of one circuit on the other during changing load condition has been found to be minimal during operation of a floodlighting unit and other electric equipment associated therewith. By way of example an air compressor unit 26 indicated as comprising an electric motor 27 connected to drive an air compressor 28 may be connected across lines 13 and 14 to provide compressed air for raising a telescoping tower or the like.

DETAILED DESCRIPTION OF FIGS. 4 AND 5

Figure 4:
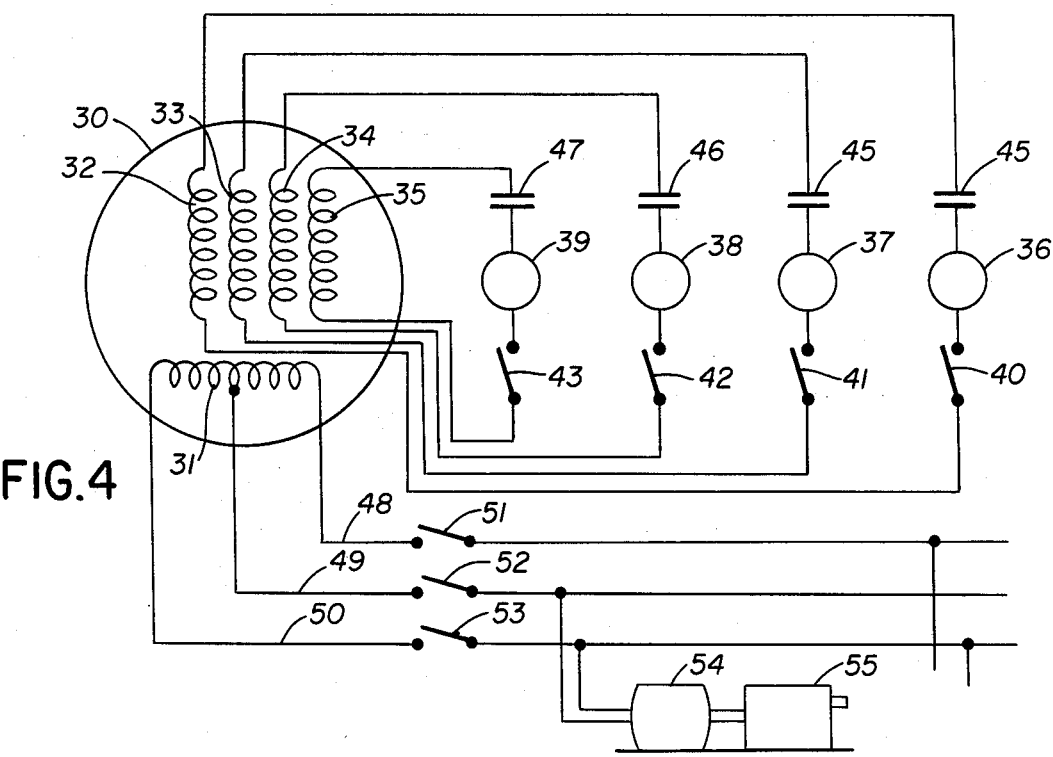
FIG. 4 is a simplified circuit diagram of a power-generating system illustrating the present modification of the system of FIG. 1.
Figure 5:
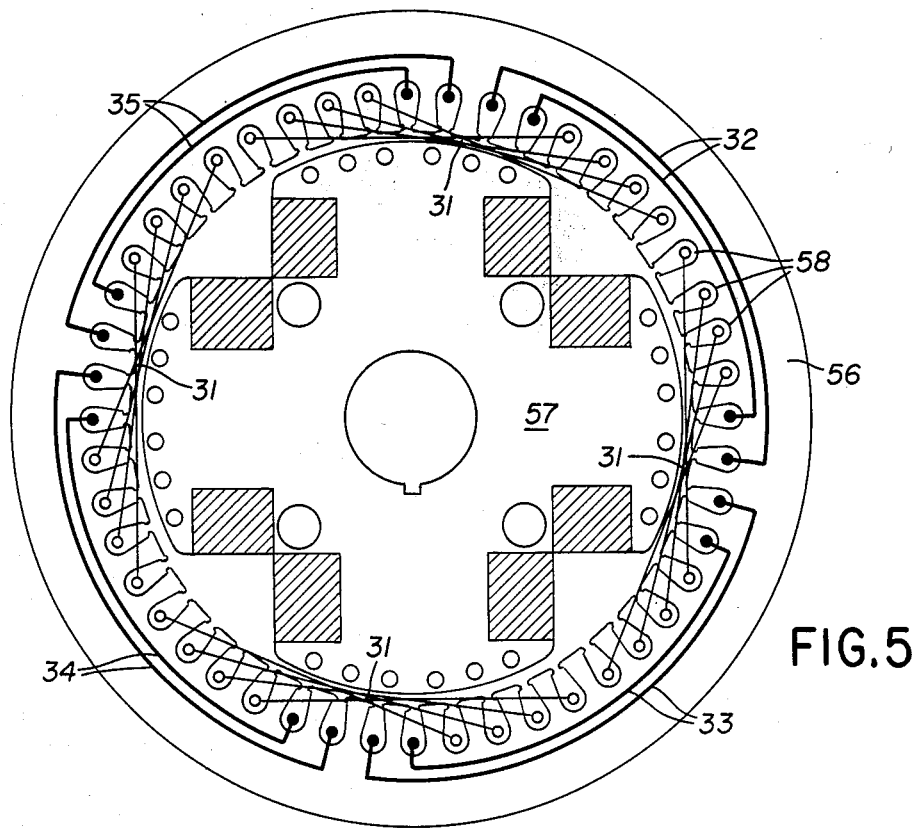
FIG. 5 is a diagrammatic sectional end elevation view of the rotor and stator of a generator for use in the system of FIG. 4.

Under some conditions of operation of the generator system as described above, when the lamps are turned on and off, the transient conditions may affect the performance of the lamps. The modification of the circuit as illustrated in FIG. 4 is provided to eliminate the effects due to transients. In this modification a generator 30 is provided with a standard voltage winding 31 and four separate high voltage windings 32, 33, 34 and 35 are provided in the alternator armature for energizing lamps 36, 37, 38 and 39, respectively, upon operation of switches 40, 41, 42 and 43, respectively. The lamps are connected in series with their respective windings through capacitors 44, 45, 46 and 47, respectively. Except for the arrangement of the windings, the generator 30 is of the same construction as the generator 10 of FIGS. 1 and 2. The windings 32, 33, 34 and 35 are located in respective armature slots to generater current at a phase difference of ninety degrees with respect to adjacent windings. The standard voltage winding 31 is connected to lines 48, 49 and 50 which are provided with switches 51, 52 and 53, respectively. Lines 49 and 50 are shown connected by switches 52 and 53 to supply current to an electric motor 54 for driving a compressor 55 which, for example, may be used for raising and lowering a telescoping tower or the like. FIG. 5 which is a diagrammatic sectional view through the generator is essentially similar to the view of FIG. 2 except for the arrangement of the windings. The generator as illustrated comprises a stationary agnetic armature 56 and a rotor 57, the armature being provided with forty-eight winding slots 58.

The high voltage windings 32, 33, 34 and 35 are located in the outer two slots of each set of the four sets of twelve slots each about the periphery of the armature. The standard voltage windings 31 are located in the next four slots this arrangement being such that the windings are ninety degrees out of phase. As a result the current in adjacent windings is ninety degrees out of phase and there is minimum interference between the adjacent windings during switching and changes of the load. Loads such as those present when fluorescent lights are being connected and disconnected may be varied without reducing or endangering the stable operation of the system. The system operates in a manner which permits the elimination of the ballast transformers normally provided in the fluorescent lamp circuits thereby saving weight, space, and cost and at the same time providing operation without loss is efficiency or in the effective starting of the lamps.

I claim:

1. A power generating system for portable floodlighting equipment and the like including a plurality of high intensity gaseous electric discharge lamps and an auxiliary electric motor-driven apparatus, an engine-driven generator for supplying alternating current to said lamps and to said auxiliary apparatus, said generator having a plurality of separate windings including a respective winding connected in a series circuit with each respective one of said lamps for supplying current at voltages sufficiently high for starting said lamps, a switch for each respective lamp circuit, and an additional separate winding connected to said motordriven apparatus for supplying current at a lower voltage for energizing said auxiliary apparatus, said generator including a magnetic core having a multiplicity of slots for retaining the windings and wherein each of said separate windings is located in a different set of said slots, each of said respective windings generating alternating current at least approximately ninety degrees out of phase with respect to that of the other and with respect to the alternating current generated by said additional winding, a respective capacitor connected in series curcuit with each of said respective windings and said respective lamps for limiting the current flowing through each said circuit when the respective lamp is conducting, the phase difference between the current flowing in said respective winding and the current flowing in said additional winding decreasing the likelihook of interference with the operation of the load on any one of said windings upon the occurrence of a change of load on another.

2. The invention set forth in claim 1 wherein said power generating system includes four of said lamps and four windings each connected in series with a respective one of said lamps and in series with a respective capacitor.

* * * * *